US008555602B2

(12) United States Patent
Kotil

(10) Patent No.: US 8,555,602 B2
(45) Date of Patent: Oct. 15, 2013

(54) LAMINATED ASSEMBLY AND METHOD FOR MAKING

(75) Inventor: Douglas L. Kotil, Lincoln, NE (US)

(73) Assignee: Laminated Wood Systems, Inc., Seward, NE (US)

( * ) Notice: Subject to any disclaimer, the term of this patent is extended or adjusted under 35 U.S.C. 154(b) by 24 days.

(21) Appl. No.: 13/303,291

(22) Filed: Nov. 23, 2011

(65) Prior Publication Data

US 2013/0125507 A1 May 23, 2013

(51) Int. Cl.
*E04C 3/00* (2006.01)
(52) U.S. Cl.
USPC ............................... 52/847; 52/836; 427/393
(58) Field of Classification Search
USPC ................... 52/836, 847; 427/291, 397, 393
See application file for complete search history.

(56) References Cited

U.S. PATENT DOCUMENTS

| 1,018,624 A | 2/1912 | Kolossvary et al. |
| 4,071,637 A | 1/1978 | Dittrich et al. |

FOREIGN PATENT DOCUMENTS

| AU | 2119295 | 10/1996 |
| WO | 9628612 | 9/1996 |

OTHER PUBLICATIONS

McFarland Cascade Laminated Poles (http://web.archive.org/web/20110202020953/http://ldm.com/.*
Lowes Top Choice 1X4X8 Pressure Treated Lumber (http://web.archive.org/web/20110112193505/http://www.lowes.com).*

* cited by examiner

*Primary Examiner* — Jeannette E Chapman
*Assistant Examiner* — Daniel Kenny
(74) *Attorney, Agent, or Firm* — Reising Ethington P.C.

(57) ABSTRACT

An adhesively joined laminated structure comprising layers of flat elongated members, at least a first member of which comprises wood and at least a first surface of the first member being treated with a preservative chemical. A recess may be provided in the first surface of the first member to improve preservative chemical absorption.

20 Claims, 3 Drawing Sheets

LAMINATED ASSEMBLY AND METHOD FOR MAKING

BACKGROUND

1. Technical Field

This invention relates generally to a system for improving preservative chemical absorption in facing unglued edges of members in an adhesively-joined laminated structure.

2. Description of the Related Art Including Information Disclosed Under 37 CFR 1.97 and 1.98

Known methods for improving absorption of preservatives in wood structures include drilling holes into wooden railroad ties in locations where the holes will prevent splitting of the wood. If drilled prior to preservative treatment, the holes will provide additional surface area to absorb preservative chemicals and allow for increased treatment penetration of a single unitary piece of wood. Similar methods are used to improve preservative treatment of cylindrical or "round" timber by incising or forming holes or slots into the outer surface of a length of round timber and treating the length of timber with a preservative chemical.

However, these treatment methods are unsuitable for application to a laminated structure such as a wood laminate stack. Making incisions to each member of the stack is impractical, and the irregular holes of traditional incising techniques may increase the problems caused by accumulation of entrapped moisture between the members, and especially among interior unglued exposed facing edges within a wood laminate stack. Furthermore, traditional treatment methods would require that each member of a laminate stack be treated separately before assembly, where it may be preferable to use a technique that would enable treatment of the entire stack after assembly.

SUMMARY

A laminated assembly is provided, which comprises adhesively-joined layers of flat elongated members, at least a first surface of a first member of which may be treated with a preservative chemical. A recess may be provided in the first surface of the first member to improve absorption of the preservative chemical and/or to improve drainage of any accumulated moisture within the assembly.

Also, a method is provided for making an adhesively-joined laminated assembly. The method may include the steps of providing a plurality of elongated members, forming a recess into at least a first surface of the first member, and treating at least the first surface of the first member with a preservative chemical after performing the forming step. The first member may then be incorporated into a laminated structure by arranging the first member in the laminated structure such that the first surface of the first member abuts a first surface of a second member of the laminated structure. At least a second surface of the first member may then be adhesively joined to a surface of at least a third member to be incorporated into the laminated structure.

DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION

Figures 1, 2:
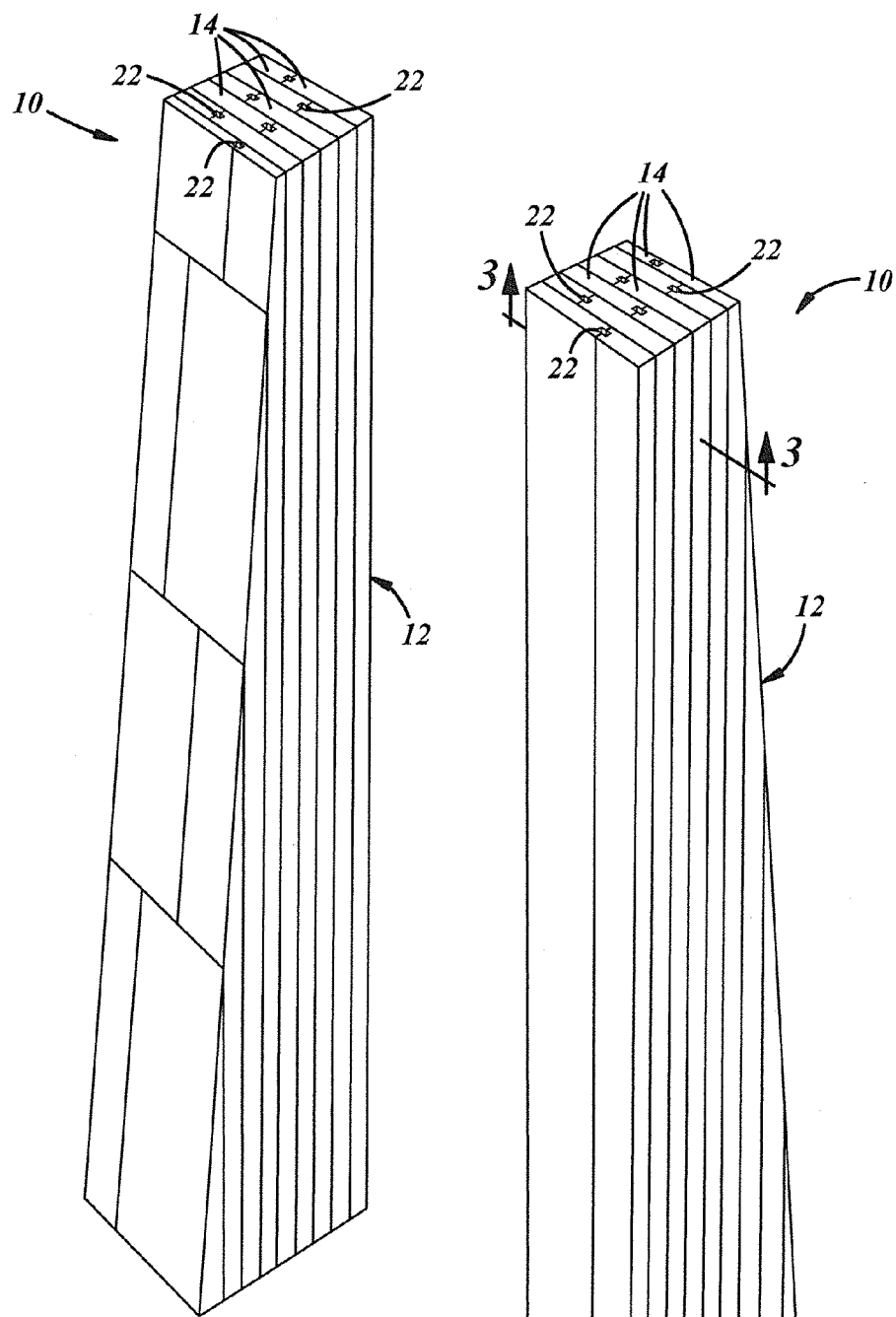
FIG. 1 is a perspective front-side-top view of a laminated structure.
FIG. 2 is perspective back-side-top view of the laminated structure of FIG. 1.
Figure 3:
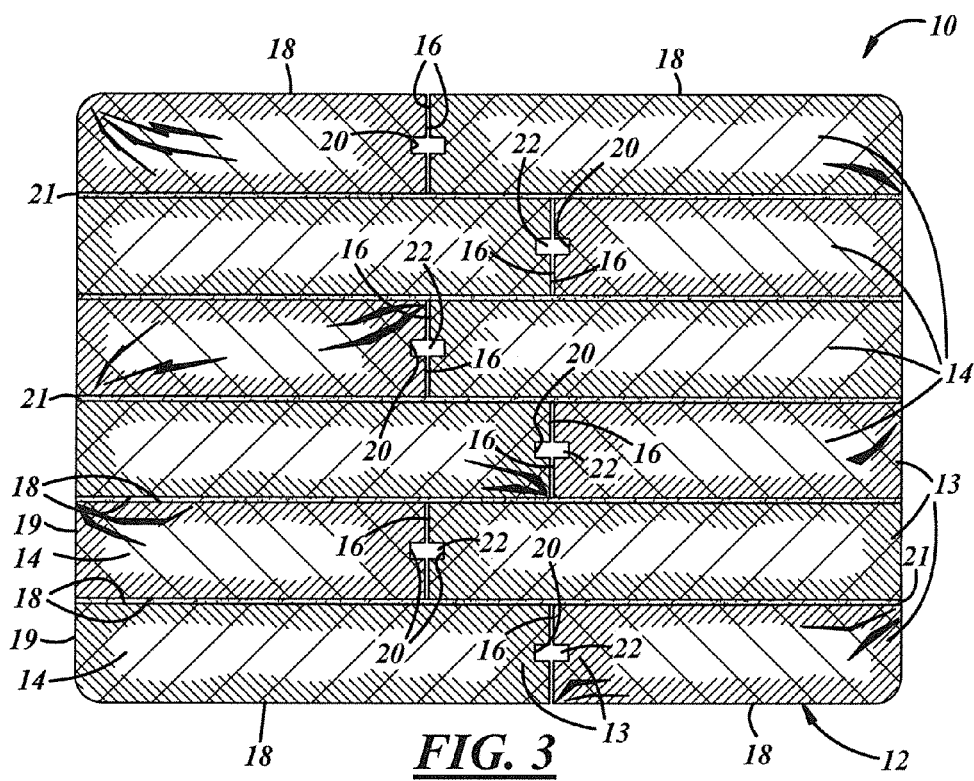
FIG. 3 is a cross sectional view of the laminated structure of FIG. 1 taken along line 3-3 of FIG. 2.

A laminated assembly for improving preservative chemical absorption in facing unglued edges of wood members in an adhesively-joined laminated structure is generally shown at 10 in FIGS. 1-3. The assembly 10 may include a laminated structure such as is generally indicated at 12 and that may comprise adhered or adhesively joined, e.g., glued-together, layers of flat elongated members such as boards 14. The members 14 may have edge surfaces 16 that are positioned to abut but remain unglued within the structure 12. A cut or incision 20 may be provided in and along abutting unglued edge surfaces 16 of the members 14, and the unglued edge surfaces 16 of the members may be treated with a preservative chemical 13. The laminated structure 12 may be a laminated wood utility pole configured to be supported in a generally upright vertical orientation by, for example, fixing a lower end of the pole in the ground.

Figure 4:
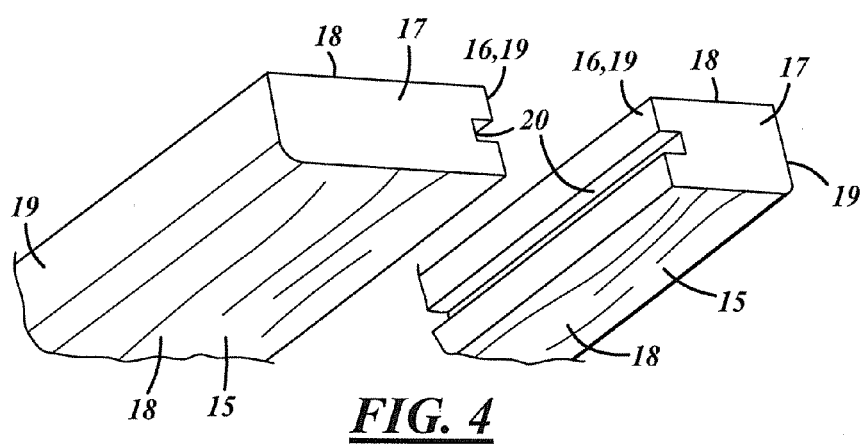
FIG. 4 is a partial isometric view of two abutting members of the laminated structure of FIG. 1 spaced apart to show grooves formed in facing unglued abutting edge surfaces of the members.

As best shown in FIG. 4, each of the members 14 may have a generally rectangular prismatic shape including opposite flat end surfaces 17, a pair of flat opposite side surfaces 18, and a pair of flat opposite edge surfaces 19, one edge surface of which may be designated to be an unglued edge surface 16. The edge surfaces 19 of each member 14 may be flat, may be disposed on opposite sides of the member 14, and may be narrower than the side surfaces 18. The edge and side surfaces 19, 18 may be generally equal in length and longer than the end surfaces 17. As is also shown in FIG. 4, each of the members 14 may have a longitudinally-oriented wood grain 15. In other words, the general direction of the grain 15 of the wood may run generally in the same direction as the longest dimensional measurement of a member 14.

As best shown in FIG. 4, there may be elongated recesses such as cuts, trenches, or grooves 20 formed longitudinally into and along the edge surfaces 16 that have been designated to remain unglued within the structure 12. The grooves 20 may be formed longitudinally into and along an entire length of each such edge surface 16 to form grooved edge surfaces 16.

The members 14 may be arranged in a laminated structure 12, as best shown in FIG. 3, such that the grooved edge surfaces 16 of certain ones of the members 14 face and/or abut the grooved edge surfaces 16 of certain other members 14 of the laminated structure 12 while facing side surfaces 18 of the members 14 may be joined together by an adhesive layer 21 or by any other suitable means. The members 14 incorporated into the laminated structure 12 may be wooden boards having rectangular prismatic shapes. However, the members 14 may be of any other suitable composition or shape. The laminated structure 12 may, but need not, include only members 14 comprising wood. One or more of the members 14 may instead or may also comprise one or more other suitable materials that may benefit from the design of the assembly 10 for reasons similar to those from which wood members 14 would benefit.

Where pairs of unglued grooved edge surfaces 16 abut, (meaning that the unglued grooved edge surfaces 16 are touching or closely spaced from and facing one another) the grooves 20 in each pair of abutting unglued grooved edge surfaces 16 may cooperate to form a single channel 22. These channels 22 may be configured to increase the assembly's moisture drainage capacity and/or to improve access for chemical preservatives into a laminated structure 12 where members 14 are assembled into such a composite laminated wood structure 12 before chemical preservative treatment.

Figure 5:
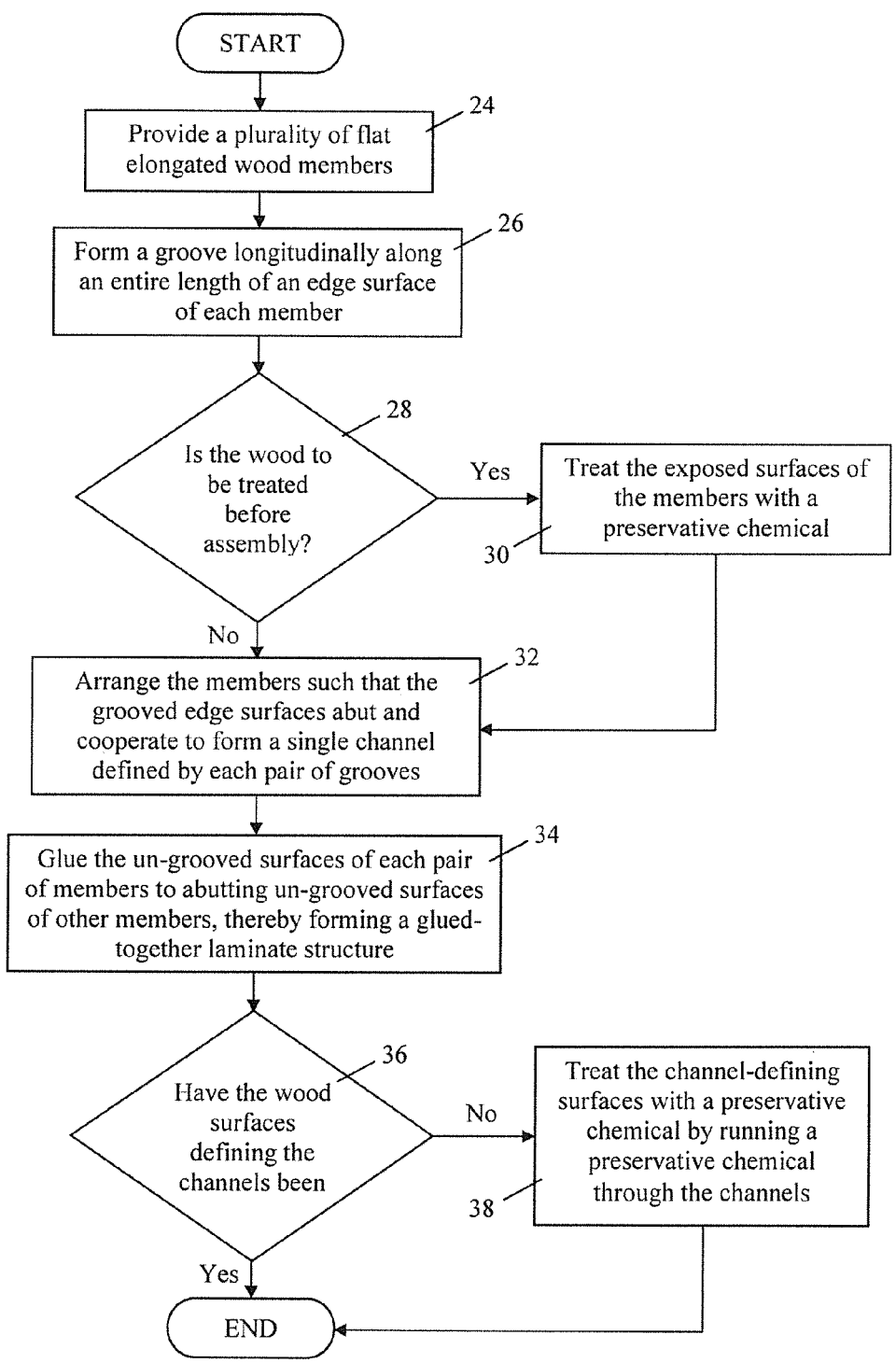
FIG. 5 is a flow chart showing a method for making a laminated assembly.

In practice, and as shown in FIG. 5, preservative chemical absorption into abutting unglued edges 16 of members 14 in a laminated structure 12 may be improved by first forming a recess such as an elongated cut, incision, or groove 20 into and along members' surfaces that have been selected or designated to be abutting unglued grooved edge surfaces 16 within the laminated structure 12, thereby forming a trench or groove 20 longitudinally into and along each designated edge surface 16 as shown in action step 26. Each such groove 20 may be formed longitudinally into and along the entire length of a designated edge surface 16.

As shown in action step 30, the designated edge surfaces 16 of each member 14 may then be treated with a preservative chemical 13. As shown in action step 28, designated grooved edge surfaces 16 of members 14 may preferably be treated preceding incorporation of those members 14 into an adhesively joined, e.g., glued-together, laminated structure 12. However, the designated grooved edge surfaces 16 of members may alternatively be treated (or given additional treatment) after incorporation by running a preservative chemical 13 through the grooves 20, i.e., through channels 22 defined by facing pairs of grooves 20 as shown in action step 38.

As shown in action step 32, the members 14 may then be incorporated into an adhesively joined or glued-together laminated wood structure 12 by arranging the members 14 such that their designated grooved edge surfaces 16 abut (such that the grooves 20 formed in these surfaces 16 face and cooperate to form channels 22), while their ungrooved side surfaces 18 are attached by a layer of adhesive 21 to abutting ungrooved side surfaces of other members 14 of the laminated structure as shown in action step 34.

Structures such as utility poles that are constructed as described above are stronger, more flexible, and easier to assemble thanks to their modular laminated construction. The grooves cut into component members of the assembly allow better absorption of preservative and better drainage of moisture accumulation, which increases the service life of the assembly.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A laminated assembly comprising:
   adhesively-joined layers of flat elongated members, at least a first member of which comprises wood and is arranged in the laminated assembly such that a first surface of the first member abuts a first surface of a second member of the laminated assembly;
   a longitudinal channel defined within the assembly by a longitudinal recess formed into and along the first surface of the first member and by a portion of the second member facing the recess; and
   a preservative chemical absorbed into the recess and into at least the portion of the second member facing the recess.

2. A laminated assembly as defined in claim 1 in which at least a second surface of the first member is fixed to a surface of at least a third member of the laminated structure.

3. A laminated assembly as defined in claim 1 in which the first member has a generally rectangular prismatic shape.

4. A laminated assembly as defined in claim 1 in which the first member has a longitudinally-oriented wood grain.

5. A laminated assembly as defined in claim 1 in which the recess is a groove formed longitudinally into and along the first surface of the first member.

6. A laminated assembly as defined in claim 5 in which the groove is formed longitudinally into and along an entire length of the first surface of the first member.

7. A laminated assembly as defined in claim 1 in which the laminated structure is a utility pole.

8. A laminated assembly as defined in claim 1 in which the members incorporated into the laminated structure are wooden boards.

9. A laminated assembly comprising:
   adhesively-joined layers of flat elongated members, at least a first member of which comprises wood;
   at least a first surface of the first member being treated with a preservative chemical;
   a recess provided in the first surface of the first member;
   a first groove formed longitudinally into and along an entire length of the first surface of the first member;
   a second groove formed longitudinally into and along an entire length of a facing surface of the second member; and
   the first and second members being disposed such that the facing surface of the second member abuts the first surface of the first member and the second groove cooperates with the first groove to form a single channel.

10. A method for making a laminated assembly, the method including the steps of:
    providing a plurality of elongated members, at least a first member of which comprises wood;
    forming a longitudinal recess into and along at least a first surface of the first member;
    treating at least the first surface of the first member with a preservative chemical after performing the forming step;
    incorporating the first member into a laminated structure by arranging the first member in the laminated assembly such that the first surface of the first member abuts a first surface of a second member of the laminated assembly and such that the longitudinal recess cooperates with a portion of the second member to form a longitudinal channel within the assembly; and
    adhesively joining at least a second surface of the first member to a surface of at least a third member to be incorporated into the laminated assembly.

11. The method of claim 10 in which the step of providing a plurality of elongated members includes providing the first member having a generally rectangular prismatic shape and comprising wood.

12. The method of claim 11 in which the step of providing a plurality of elongated members includes providing the first member having a wood grain oriented generally longitudinally.

13. The method of claim 10 in which the step of forming a recess into at least a first surface of the first member includes forming a groove longitudinally into and along the first surface of the first member.

14. The method of claim 13 in which the step of forming a recess into at least a first surface of the first member includes forming the groove longitudinally into and along an entire length of the first surface of the first member.

15. The method of claim 10 in which the treating step is performed preceding the incorporating step.

16. The method of claim 10 in which the treating step is performed following the incorporating step.

17. The method of claim 10 in which the step of incorporating the first member into a laminated structure includes incorporating the first member into a laminated utility pole.

18. The method of claim 10 in which:
the step of providing a plurality of elongated members includes providing a plurality of wooden boards; and
the step of incorporating the first member into a laminated structure includes incorporating the first member into a laminated structure comprising the wooden boards.

19. The method of claim 10 in which:
the forming step includes the steps of:
forming a first groove longitudinally into and along an entire length of the first surface of the first member, and
forming a second groove longitudinally into and along an entire length of a facing surface of the second member; and
the incorporating step includes arranging the second member such that the facing surface of the second member abuts the first surface of the first member and the second groove cooperates with the first groove to form a single channel.

20. A laminated assembly as defined in claim 1 in which:
a second groove is formed longitudinally into and along the first surface of the second member; and
the first and second members are disposed such that the first surface of the second member abuts the first surface of the first member and the second groove cooperates with the first groove to form the channel.

* * * * *